United States Patent
Isberg et al.

(10) Patent No.: US 10,641,864 B2
(45) Date of Patent: May 5, 2020

(54) ACOUSTIC RANGING BASED POSITIONING OF OBJECTS USING SOUND RECORDINGS BY TERMINALS

(71) Applicant: Sony Mobile Communications Inc., Tokyo (JP)

(72) Inventors: Peter Isberg, Lund (SE); Magnus Persson, Lund (SE)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 16/073,030

(22) PCT Filed: Feb. 12, 2016

(86) PCT No.: PCT/JP2016/000732
§ 371 (c)(1),
(2) Date: Jul. 26, 2018

(87) PCT Pub. No.: WO2017/138043
PCT Pub. Date: Aug. 17, 2017

(65) Prior Publication Data
US 2019/0086508 A1  Mar. 21, 2019

(51) Int. Cl.
*G01S 5/22* (2006.01)
*G01S 5/02* (2010.01)
(Continued)

(52) U.S. Cl.
CPC ............. *G01S 5/22* (2013.01); *G01S 5/0257* (2013.01); *G01S 19/45* (2013.01);
(Continued)

(58) Field of Classification Search
CPC .......... G01S 5/22; G01S 19/45; G01S 5/0257; H04W 64/006; H04R 29/004; G06F 21/6254
See application file for complete search history.

(56) References Cited

U.S. PATENT DOCUMENTS

2012/0214515 A1    8/2012  Davis et al.
2012/0263020 A1*  10/2012  Taylor ..................... G01S 5/18
                                                           367/124

(Continued)

FOREIGN PATENT DOCUMENTS

CN           104422922         3/2015

OTHER PUBLICATIONS

Notification Concerning Transmittal of International Preliminary Report on Patentability, in corresponding PCT Application No. PCT/JP2016/000732 (14 pages) dated Aug. 23, 2018.
(Continued)

*Primary Examiner* — Mazda Sabouri
(74) *Attorney, Agent, or Firm* — Myers Bigel, P.A.

(57) ABSTRACT

An electronic communications terminal records in a memory a sampled audio segment of sound sensed by a micro-phone. A time stamp associated with timing of the recording of the sampled audio segment is determined and stored in the memory associated with the sampled audio segment. The sampled audio segment and the time stamp are transmitted through a network interface toward a location service client of a network node that determines location of the electronic communications terminal based on correlating the sampled audio segment and other sampled audio segments of the sound received from other electronic communications terminals. A related network node and corresponding methods by terminals and network nodes are disclosed.

18 Claims, 10 Drawing Sheets

(51) Int. Cl.
   *G01S 19/45* (2010.01)
   *G06F 21/62* (2013.01)
   *H04R 29/00* (2006.01)
   *H04W 64/00* (2009.01)

(52) U.S. Cl.
   CPC ....... *G06F 21/6254* (2013.01); *H04R 29/004* (2013.01); *H04W 64/006* (2013.01)

(56) References Cited

U.S. PATENT DOCUMENTS

| | | | | |
|---|---|---|---|---|
| 2013/0065611 A1* | 3/2013 | Park | ...................... | G01S 5/0036 455/456.2 |
| 2013/0188456 A1* | 7/2013 | Adcock | ..................... | G01S 5/18 367/127 |
| 2015/0046741 A1* | 2/2015 | Yen | .......................... | G06F 1/12 713/400 |
| 2015/0168538 A1* | 6/2015 | Bradley | ................ | G01S 5/0257 367/127 |
| 2018/0164403 A1* | 6/2018 | Inoue | ..................... | G01M 3/24 |

OTHER PUBLICATIONS

Notification of Transmittal of the International Search Report and the Written Opinion of the International Searching Authority, or the Declaration, in corresponding PCT Application No. PCT/JP2016/000732 (18 pages) (dated Dec. 14, 2016).
Zhayida et al. "An automatic system for microphone self-localization using ambient sound" 2014 22nd European Signal Processing Conference (EUSIPCO) (pp. 954-958) (Sep. 2014).

\* cited by examiner

ACOUSTIC RANGING BASED POSITIONING OF OBJECTS USING SOUND RECORDINGS BY TERMINALS

CROSS-REFERENCE TO RELATED APPLICATIONS

The present application is a 35 U.S.C. § 371 national phase application of PCT Application Serial No. PCT/JP2016/000732, filed Feb. 12, 2016, the disclosure of which is hereby incorporated herein in its entirety by reference.

TECHNICAL FIELD

The present invention relates to the field of wireless communications in general and, more particularly, to determining the location of objects using terminals of a wireless communication system.

BACKGROUND ART

Many communication terminals, such as cellular communication terminals, cellular phones, smart watches, tablet computers, laptop computers, and data terminals, are now equipped with Global Network Satellite System (GNSS) receivers to enable users to determine their location. GPS is a space-based radio trilateration system using a constellation of satellites in orbit around the Earth. A GNSS receiver trilaterates its position based on timing of radio signals it receives from various ones of the satellites and the known location of those satellites. Example GNSS systems include Global Positioning System (GPS), Global Orbiting Navigation Satellite System (GLONASS), and Galileo.

Determining the position of a GNSS receiver typically requires the acquisition of a set of navigational parameters from the navigational data signals of four or more GNSS satellites. The algorithms that are used to acquire GNSS signals and determine position therefrom are typically complex and may require substantial processing throughput. The process of monitoring GNSS signals can be significantly affected by environmental factors. For example, GNSS signals that may be easily acquired in the open typically become harder or impossible to acquire when a receiver terminal is within a building.

Location determination systems used for emergency calling have been determined in some circumstances to fail during more than 50% of e911 calls originated from terminals inside buildings. The Federal Communications Commission (FCC) in the United States has therefore asked the telecommunications industry to provide improved terrestrial positioning systems. New proposed positioning systems include Terrestrial Beacon Systems system that uses powerful terrestrially-based transmitters to transmit very precise timed signal and information over a GNSS-like channel about the geographic location of the transmitters. However, these systems will require significant investment to deploy new infrastructure.

SUMMARY

Various methods, wireless communication terminals, and network nodes are disclosed herein that operate to identify the location of a sound source based on shared sound recorded by terminals of a wireless communication system, and which may be performed while protecting privacy of content of the sound.

Some embodiments are directed to a wireless communications terminal that includes a network interface, a microphone, a processor, and a memory. The microphone is configured to sense sound. The processor is coupled to the microphone and the network interface. The memory is coupled to the processor and stores computer readable program code that is executable by the processor to perform operations that include recording in the memory a sampled audio segment of the sound sensed by the microphone. A time stamp associated with timing of the recording of the sampled audio segment is determined and stored in the memory associated with the sampled audio segment. The sampled audio segment and the time stamp are transmitted through the network interface, toward a location service client of a network node that determines location of a sound source and/or a location of the electronic communications terminal based on correlating the sampled audio segment and other sampled audio segments of the sound received from other electronic communications terminals.

In some further embodiments, the processor is further configured by the computer readable program code to receive a location identification message from the location service client of the network node, via the network interface, the location identification message containing data identifying a geographic location of the wireless communications terminal. The processor provides the data identifying the geographic location to a location service user application being executed by the processor.

The terminal may further include a cellular transceiver. Determination of the time stamp can include repetitively synchronizing an internal clock circuit responsive to repetitive occurrences of a defined signal received through the cellular transceiver from a cellular radio base station, and determining the time stamp based on a clock signal from the internal clock circuit when a defined event occurs associated with the recording of the sampled audio segment.

The terminal may further include a satellite signal receiver. The determination of the time stamp can include repetitively synchronizing an internal clock circuit responsive to repetitive occurrences of a defined signal received through the satellite signal receiver from at least three satellites, and determining the time stamp based on a clock signal from the internal clock circuit when a defined event occurs associated with the recording of the sampled audio segment.

In another embodiment, the determination of the time stamp includes generating an indication of a level of accuracy of the time stamp. The indication of the level of accuracy of the time stamp is then transmitted through the network interface toward the location service client for use when determining the location of the terminal. In a further embodiment, the terminal includes a radio frequency transceiver, and the indication of the level of accuracy of the time stamp is determined based on an elapsed time since a last successful synchronization of an internal clock circuit was completed based on timing of a defined signal received through the radio frequency transceiver.

In another embodiment, the determination of the time stamp includes determining time latency between sound being sensed by the microphone and a corresponding portion of the sampled audio segment being recorded in the memory, obtaining a time value from an internal clock circuit when a defined event occurs associated with the recording of the sampled audio segment, and generating the time stamp based on removing the time latency from the time value.

Some further embodiments are directed to operations and methods for generating the privacy protected audio segment by rendering unintelligible any human voice component in the sampled audio signal. In one embodiment, the terminal determines indications of elapsed time between locations of waveform peaks in the sampled audio segment, and generates the privacy protected audio segment to contain a listing of the indications of elapsed time. The terminal may also measure amplitude values of the waveform peaks in the sampled audio segment, and generate the privacy protected audio segment to further contain the listing of the amplitude values of the waveform peaks.

In another embodiment, generation of a privacy protected audio segment includes performing a Hilbert transform on the sampled audio segment to generate a transformed sampled audio segment, and down-sampling the transformed sampled audio segment to blur any human voice component thereof.

In another embodiment, generation of a privacy protected audio segment includes filtering the sampled audio segment to remove a frequency range component that is within a major portion of a range of human voice.

In another embodiment, the terminal includes a plurality of microphones. Generation of a privacy protected audio segment includes identifying a near-field component of the sound and a far-field component of the sound based on correlating signals received by the plurality of the microphones. The near-field component is identified based on greater amplitude variations between the correlated signals compared to the fair-field component. The processing of the sampled audio segment to render unintelligible any human voice component thereof to generate the privacy protected audio segment includes removing the near-field component of the sound from the sampled audio segment of the sound recorded in the memory while leaving the far-field component of the sound in the sampled audio segment of the sound recorded in the memory.

In another embodiment, the terminal includes a sound activity detector circuit configured to identify start and stop sound transitions in the sampled audio segment of the sound recorded in the memory. Generation of a privacy protected audio segment includes measuring timing of the start and stop transitions identified by the sound activity detector circuit in the sampled audio segment of the sound recorded in the memory, and generating the privacy protected audio segment to contain the timing of the start and stop transitions.

In another embodiment, the terminal includes a movement detector circuit configured to sense movement of the terminal. The terminal can initiate the recording of the sampled audio segment in the memory responsive to receiving a command instructing the terminal to determine its geographic location, and delay initiation of the recording of the sampled audio segment into the memory following receipt of the command when the movement detector circuit indicates the terminal is being moved and until the movement detector circuit no longer indicates the terminal is being moved.

In another embodiment, the terminal initiates the recording of the sampled audio segment in the memory responsive to receiving a command instructing the wireless communications terminal to determine its geographic location, and delays initiation of the recording of the sampled audio segment into the memory following receipt of the command when the movement detector circuit indicates the terminal is being moved and until either the movement detector circuit no longer indicates the terminal is being moved or responsive to expiration of a defined elapsed time following the receipt of the command. Upon expiration of the defined elapsed time while the movement detector circuit indicates the terminal is being moved, the terminal estimates at least a two dimensional distance that the terminal has moved while recording the sampled audio segment in the memory and transmits the estimate of the at least a two dimensional distance with the privacy protected audio segment and the time stamp through a radio frequency transceiver and a radio network node toward the location service client of the network node.

Some other embodiments are directed to operations and methods by network node providing a location service to electronic communications terminals. The network node includes a network interface, a processor, and a memory. The network interface is configured to communicate with a plurality of electronic communications terminals. The processor is coupled to the network interface. The memory is coupled to the processor and storing computer readable program code that is executable by the processor to perform operations that include receiving messages from the wireless communications terminals through the network interface. Each of the messages contains a sampled audio segment and a time stamp. The time stamp indicates timing associated with when the sampled audio segment was recorded by the wireless communications terminal. The network node identifies a similar pattern in the sampled audio segments contained in one of the messages received from each of the terminals, identifies timing offsets between the similar pattern identified in the sampled audio segments using the time stamps contained in the one of the messages received from each of the terminals, and determines location of a sound source of the sound and/or a location of the electronic communications terminals based on the timing offsets. The network node then communicates the location to the at least one of the terminals and/or another network node through the network interface.

In a further embodiment, the network node is further configured by the computer readable program code to identify based on an indicator contained in the one of the messages received from each of the terminals whether any of the terminals were moving during their sensing of the sound by the microphone to generate the privacy protected audio segment. The identification of the similar pattern in the sampled audio segments can include cross-correlating a pattern in the sampled audio segment contained in the one of the messages received from each of the terminals using the time stamps, and adjusting size of a window used for the cross-correlation that uses the one of the messages received from any one of the terminals that has been identified as having moved during its sensing of the sound by the microphone to generate the sampled audio segment.

In a further embodiment, the network node is further configured by the computer readable program code to obtain, from the one of the messages received from any one of the terminals that has been identified as having moved during its sensing of the sound by the microphone to generate the sampled audio segment, an estimate of a distance that the any one of the terminals has moved during its recording of the sound. The network node adjusts size of the window used for the cross-correlation based on the estimate of the distance.

In a further embodiment, the network node is further configured by the computer readable program code to obtain an indication of a level of accuracy of the time stamp contained in the one of the messages received from each of the terminals. Identification of the similar pattern in the sampled audio segments can include cross-correlating a pattern in the sampled audio segment contained in the one of the messages received from each of the terminals using the time stamps, and adjusting size of a window used for the cross-correlation of the one of the messages received from the terminals based on the indications of the level of accuracy of the time stamps used for the cross-correlation.

In a further embodiment, determination of the location of the sound source of the sound and/or the location of the one of the terminals based on the timing offsets can include determining acoustic range between the one of the terminals and the other ones of the terminals based on the timing offsets determined between the similar pattern identified in the privacy protected audio segments. In a further embodiment, the determination of the location can include determining a geographic location of a GNSS assisted one of the terminals based on GNSS location reported by the GNSS assisted one of the terminals to the network node, and determining the location of the one of the terminals based on a combination of the geographic location of the GNSS assisted one of the terminals and the acoustic range between the one of the terminals and the GNSS assisted one of the terminals.

Other electronic communications terminals, network nodes, and corresponding methods according to embodiments of the invention will be or become apparent to one with skill in the art upon review of the following drawings and detailed description. It is intended that all such electronic communications terminals, network nodes, and corresponding methods be included within this description, be within the scope of the present invention, and be protected by the accompanying claims.

BRIEF DESCRIPTION OF DRAWINGS

The accompanying drawings, which are included to provide a further understanding of the invention and are incorporated in and constitute a part of this application, illustrate certain embodiments of the invention. In the drawings.

DESCRIPTION OF EMBODIMENTS

The present invention will be described more fully hereinafter with reference to the accompanying figures, in which embodiments of the invention are shown. This invention may, however, be embodied in many alternate forms and should not be construed as limited to the embodiments set forth herein.

As explained above, determining the location of wireless communication terminals using existing positioning technologies is complicated by the absence or insufficient strength of radio frequency (RF) signaling at many locations. Various embodiments of the present disclosure seek to reduce or avoid these problems.

Figure 1:
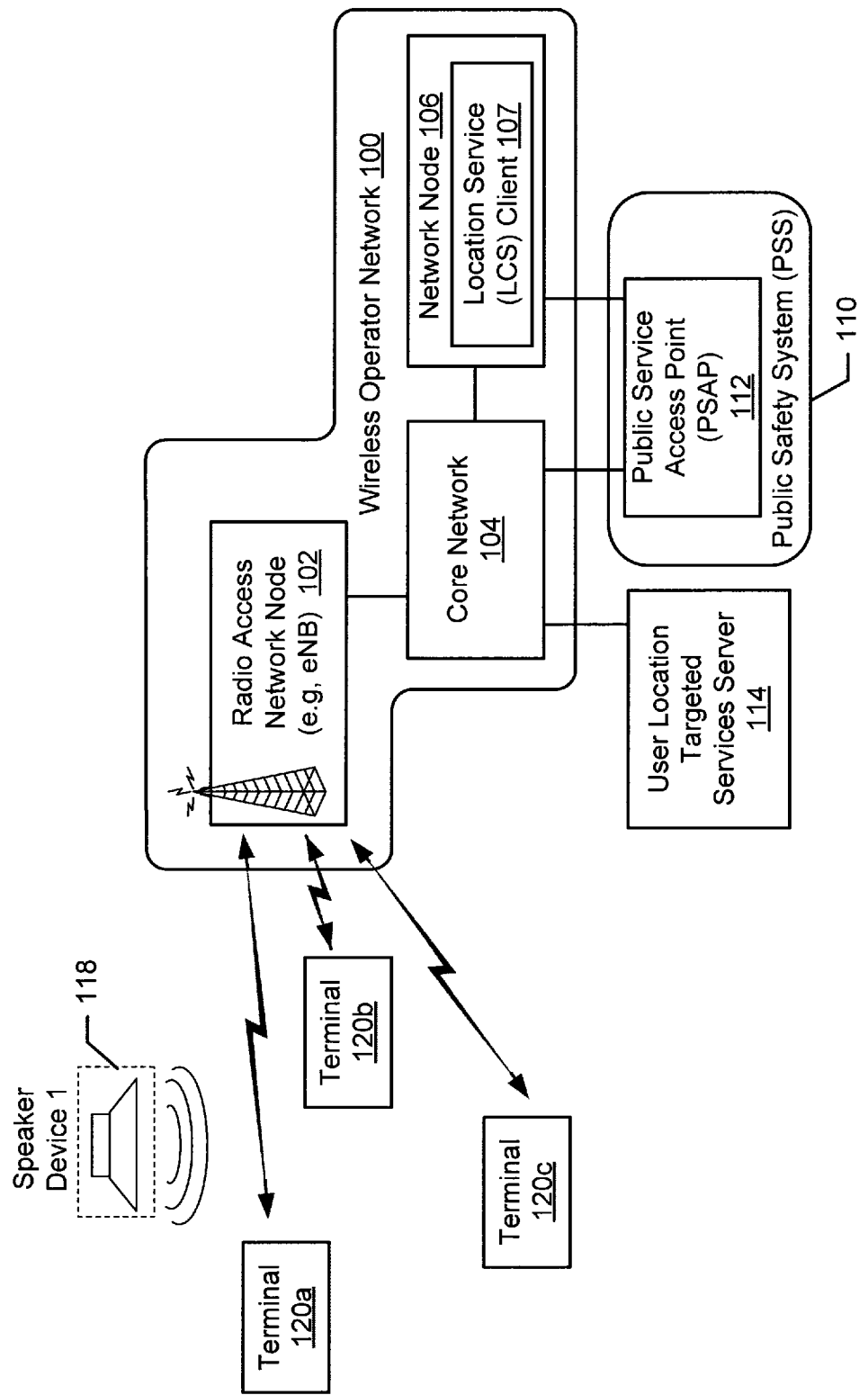
FIG. 1 is a schematic block diagram of an example wireless operator network that determines the location of sound sources based on processing recordings of privacy protected sound recordings received from wireless electronic communications terminals in accordance with some embodiments of the present disclosure.

These embodiments are described in the context of the non-limiting illustration of FIG. 1 which is a schematic block diagram of an example wireless operator network 100 that determines the locations of a source source(s) and/or the locations the electronic communications terminals 120a-120c based on sound recordings of the sound source(s) performed by electronic communications terminals 120a-120c, which are also referred to as "terminals" for brevity, and/or determines the locations of the electronic communications terminals themselves. In the example of FIG. 1, the terminals have been illustrated as being wireless communications terminals although they may alternatively communicate via wired connections. A terminal can include, but is not limited to, any electronic communications device, but in some embodiments is configured to transmit and receive radiofrequency communication signals via a long range wireless interface such as, for example, a cellular interface, via a short range wireless interface such as, for example, a Bluetooth wireless interface, a wireless local area network (WLAN) interface such as IEEE 801.11a-g, and/or via another RF interface. Example terminals include, but are not limited to, cellular phones, tablet computers, laptop computers, and data terminals that are configured to communicate via a cellular radio interface, a Bluetooth radio interface, WLAN radio interface, and/or another RF interface. Although three terminals have been illustrated in FIG. 1 for convenience of description, any number of terminals may be used with various embodiments of the present disclosure.

The wireless operator network 100 includes a network node 106 that provides a location service client 107 which determines the relative locations of the terminals 120a-120c and may furthermore determine the geographical location of at least one of the terminals 120a-120c. The terminals 120a-120c are configured to communicate with the location service client 107 via one or more radio access network nodes (e.g., eNB(s)) 102, referred to as a "RAN" for brevity, and a core network 104. The RAN 102 may be configured to operate using one or more cellular radio access technologies, including, but are not limited to, wideband-CDMA, Universal Mobile Telecommunications System (UMTS), and/or 3GPP LTE (3rd Generation Partnership Project Long Term Evolution, and/or operate according to WLAN and/or another RF communication protocol.

Although various embodiments of the present disclosure are described in the context of operating wireless communication terminals to record sound that is provided to a network node for processing, the terminals are not necessarily mobile and may communicate via wired connections to the network node.

The terminals 120a-120c are configured to record a sampled audio segment of sound that is sensed by a microphone of each of the terminals 120a-120c, and to transmit the sampled audio segment along with an accurate timestamp associated with the recording to the location service client 107. In the example of FIG. 1 the recorded sound is generated by a separate speaker device 118. The sound may alternatively be generated by any sound source (e.g., a person, a television, an office electronic machine such as a copier or printer, a phone ringing, etc.) that has sufficient acoustic level to be sensed and recorded by each of the terminals 120a-120c.

The location service client 107 is configured to determine the location of a sound source of the sound and/or the location of the terminal 120a relative to the other terminals 120b-120c based on correlating the sampled audio segment and timestamp received from the terminal 120a to the sampled audio segments and timestamps received from the other terminals 120b-120c that have recorded the same sound. Moreover, the geographic location of the terminal 120a can be further determined using the location of itself determined relative to another one of the other terminals 120b-120c which has a known geographic location. The other terminal can have a known geographic location because it has at least temporarily received sufficient radiofrequency signaling (e.g., GNSS signals and/or network assisted positioning using time) to allow its geographic location to be presently or recently determined. The other terminal 120b/120c may determine its geographic location using, for example, satellite signals received from GNSS satellites. Alternatively or additionally, the other terminal 120b/120c may determine its geographic location using network assisted positioning that is based on trilateration operations that use time difference of flight measurements for communication signals received from and/or transmitted to a plurality of the cellular radio base stations 102 having known geographic locations.

In one example scenario, the terminal 120a is located within a building further from a window than terminal 120b. The terminal 120b can receive sufficient GNSS signaling to determine its geographic location while terminal 120a cannot. In accordance with some embodiments, the relative positioning between terminal 120a and 120b is determined based on reported sampled audio segments of sound that is recorded by each of the terminals 120a-120c, and the geographic location of terminal 120a can be further determined based on the geographic location determined by and/or for terminal 120b.

The location service client 107 communicates the location to the terminal 120a and/or to another network node. In one embodiment, the location service client 107 communicates data identifying the determined location to the terminal 120a which provides the data identifying the location to a location service user application 146 being executed by a processor of the terminal 120a, such as a map application or other application that requests or can otherwise operationally use the location. In another embodiment, the location service client 107 provides the determined location of the terminal 120a to a public service access point (PSAP) 112 of a public safety system (PSS) 110 as part of an emergency communication, such as an emergency call (e.g., e911 telephone call) or emergency text message originating from the terminal 120a. Public safety personnel can thereby be informed of the geographic location of a person who is operating the terminal 120a when establishing the emergency call or sending the emergency text message. In still another embodiment, the location service client 107 provides the determined location of the terminal 120a to a user location targeted services computer server 114, such as a network-based map information server, targeted location advertising server, etc.

Because the terminals 120a-120c are providing sampled audio segments of sound they have sensed to other devices, i.e., the RAN(s) 102, the core network 104, and the network node 106, serious privacy concerns may arise. At least some embodiments of the present disclosure reduce or eliminate these concerns by configuring the terminals 120a-120c to process the sampled audio segments to render unintelligible any human voice component thereof. The processed sampled audio segments are referred to as privacy protected audio segments.

Figure 2:
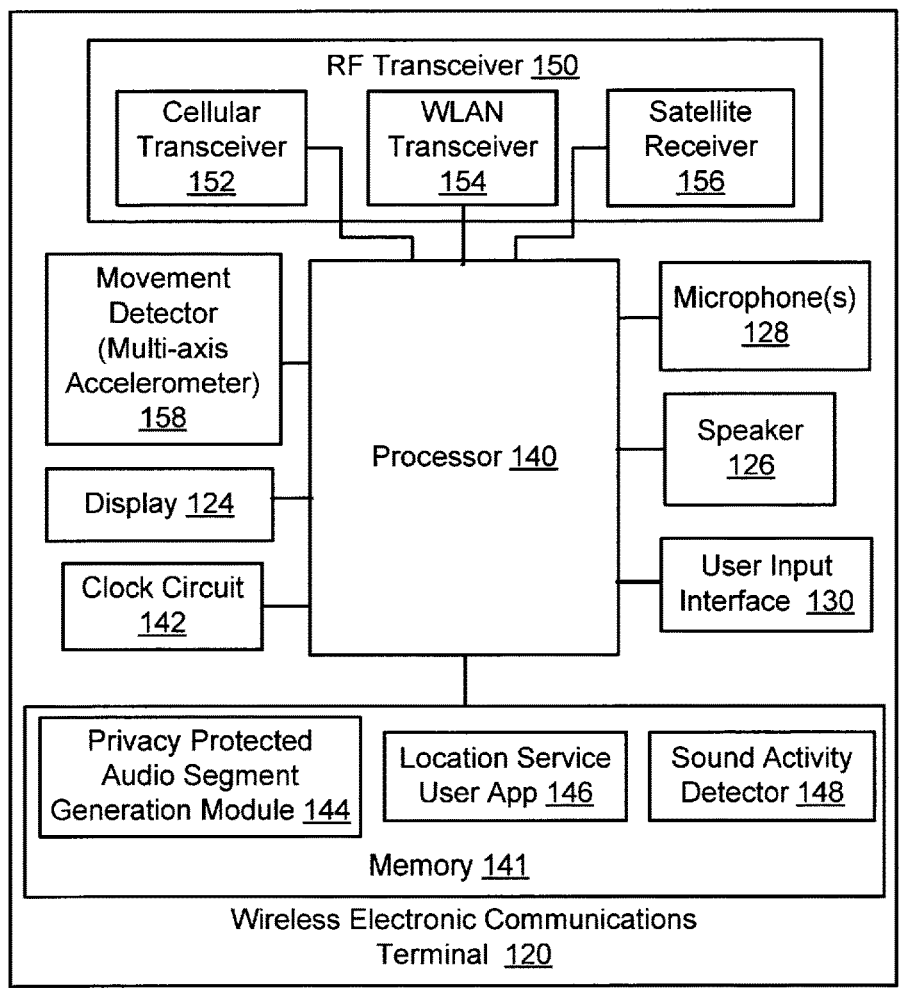
FIG. 2 is a block diagram of a wireless electronic communications terminal that is configured according to some embodiments of the present disclosure.
Figure 3:
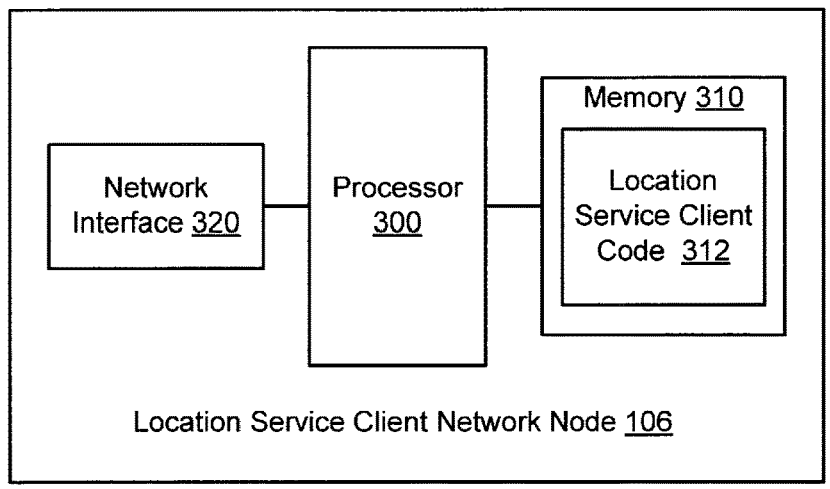
FIG. 3 is a block diagram of a network node providing a location service client configured according to some embodiments of the present disclosure.
Figure 4:
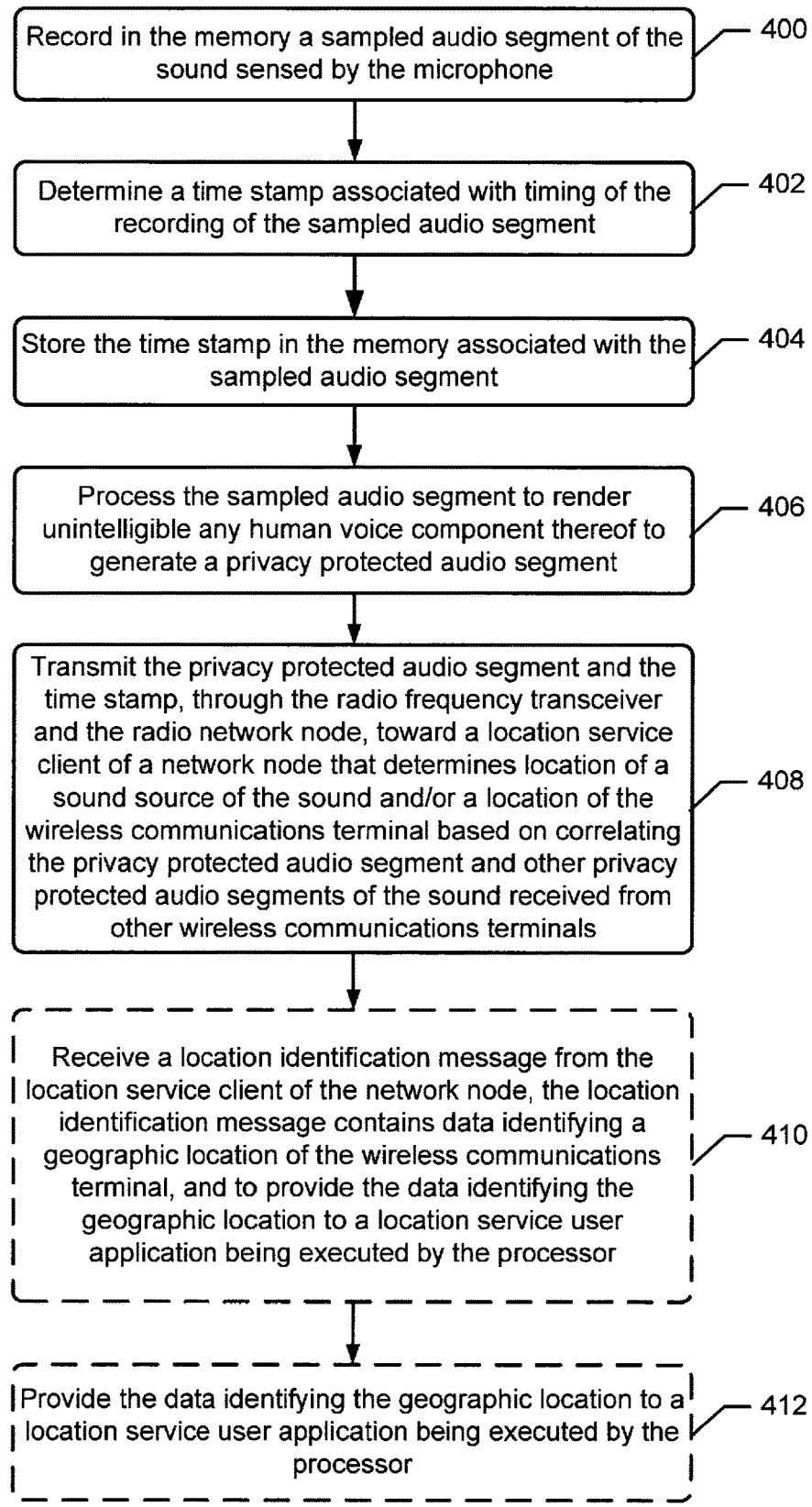
FIG. 4 is a flowchart of operations and methods that may be performed by an electronic communications terminal according to some embodiments of the present disclosure.
Figure 5:
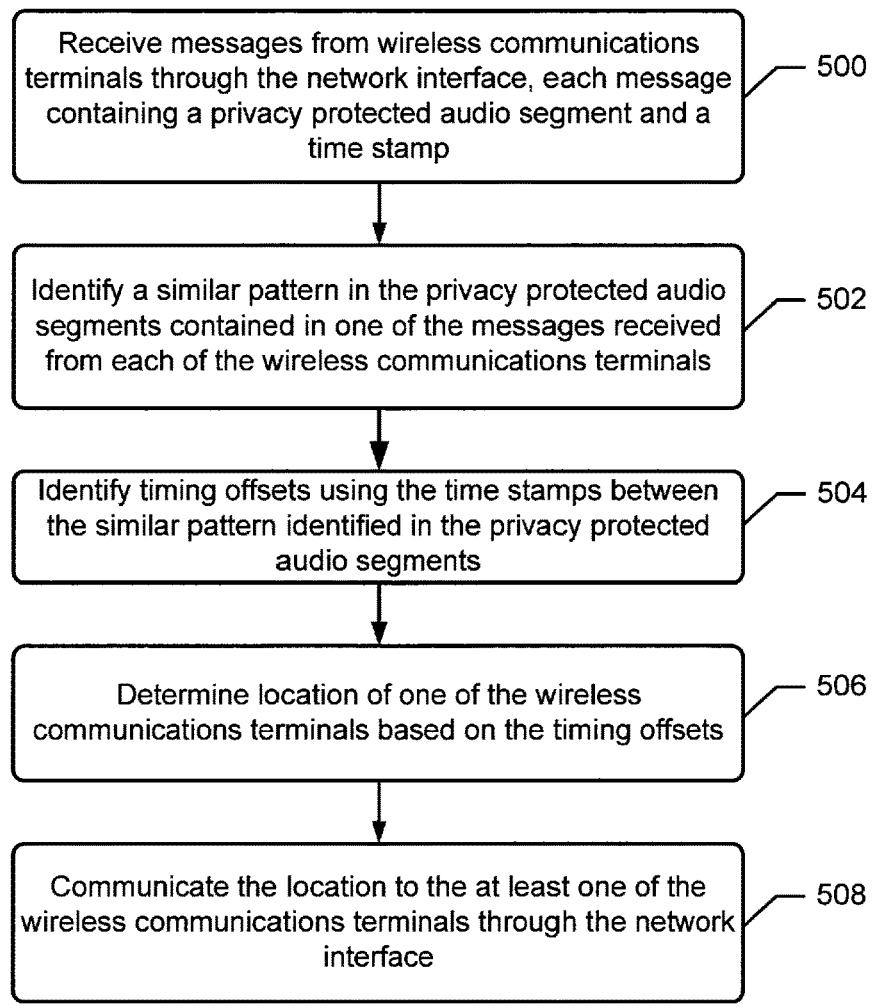
FIG. 5 is a flowchart of operations and methods that may be performed by a network node providing a location service client according to some embodiments of the present disclosure.

FIG. 2 is a block diagram of a wireless electronic communications terminal, e.g., each of terminals 120a-120c, that is configured according to some embodiments of the present disclosure. FIG. 3 is a block diagram of a network node 106 providing a location service client 107 configured according to some embodiments of the present disclosure. FIG. 4 is a flowchart of operations and methods that may be performed by one or more of the terminals 120a-120c according to some embodiments of the present disclosure. FIG. 5 is a flowchart of operations and methods that may be performed by the network node 106 providing the location service client 107 according to some embodiments of the present disclosure. FIGS. 4 and 5 are described in the context of FIG. 1 for convenience of explanation and without limitation on the scope of disclosure.

Referring to FIGS. 2 and 4, the terminal 120, which can correspond to one or more of the terminals 120a-120c, includes a radio frequency transceiver 150, a microphone 128, a processor 140 coupled to the microphone 128 and the transceiver 150, and a memory circuit (memory) 141. The transceiver 150 is configured to communicate with the RAN 102. The microphone 128 is configured to sense sound, such as from the speaker 118. The processor 140 may include one or more data processing circuits, such as a general purpose and/or special purpose processor, e.g., microprocessor and/ or digital signal processor, that may be collocated or distributed across one or more networks. The memory 141 is coupled to the processor 140 and stores computer readable program code that is executable by the processor 140 to perform at least some of the operations and methods described herein as being performed by a terminal 120. The operations and methods include recording (block 400) in the memory 141 a sampled audio segment of the sound sensed by the microphone 128. A time stamp that is associated with timing of the recording of the sampled audio segment is determined (block 402), and stored (block 404) in the memory 141 with a programmatically defined association with the sampled audio segment.

Privacy of the sampled audio segment may be protected by the processor 140 processing (block 406) the sampled audio segment to render unintelligible any human voice component thereof and generate a privacy protected audio segment as an output. The processor 140 then transmits (block 408) the privacy protected audio segment and the time stamp, through the transceiver 150 and the RAN 102, toward the location service client 107 of the network node 106. The location service client 107 determines location of a sound source of the sound and/or a location the terminal 120a based on correlating the privacy protected audio segment and other privacy protected audio segments of the same sound which have been received from the other terminals 120b and 120c.

The terminal 120a, via the processor 140, can be further configured to receive (block 410) a location identification message from the location service client 107. The location identification message contains data identifying a geographic location of the terminal 120a. The terminal 120a then provides (block 412) the data identifying the geographic location to a location service user application 146 being executed by the processor 140, such as to a map application or other application that requests or which can otherwise operationally use present location information.

The terminal 120 may further include a display 124 and a user input interface 130. A privacy protected audio segment generation module in the memory 141 may be executed by the processor 140 to generate the privacy protected audio segment according to one or more of the embodiments herein. The memory 141 may include a location service user application 146 that is executed by the processor 140, and that uses the location of the terminal 120 which is determined by the network node 106 and reported by the terminal 120. The application 146 may be a map application or other application that requests or can otherwise operationally use the terminal's location. The RF transceiver 150 can include a cellular transceiver 152, a WLAN transceiver 154, a satellite receiver 156, and/or another RF transceiver.

Referring to FIGS. 3 and 5, the network node 106 includes a network interface 320, a processor 300, and a memory 310. The network interface 320 is configured to communicate via the core network 104 and the RAN 102 with the terminals 120a-120c. The processor 300 is coupled to the network interface 320. The processor 300 may include one or more data processing circuits, such as a general purpose and/or special purpose processor, e.g., microprocessor and/or digital signal processor, that may be collocated or distributed across one or more networks. The memory 310 is coupled to the processor 300 and stores computer readable program code, which includes location service client code 312 that is executable by the processor 300 to perform at least some of the operations and methods described herein as being performed by a network node 106. The operations and methods include receiving (block 500) messages from the terminals 120a-120c through the network interface 320 and determining locations of the terminals 120a-120c and/or one or more sound sources of sound in accordance with one or more embodiments herein. Each of the messages contains a privacy protected audio segment and a time stamp. The privacy protected audio segment contains data characterizing sound sensed by the microphone 128 of a respective one of the terminals 120a-120c and which has been processed to render unintelligible any human voice component thereof. The time stamp indicates timing associated with when the sampled audio segment was recorded by the terminal 120a-120c.

The processor 300, via the location services client 312, identifies (block 502) a similar pattern in the privacy protected audio segments contained in one of the messages received from each of the terminals 120a-120c, and identifies (block 504) timing offsets between the similar pattern identified in the privacy protected audio segments using the time stamps contained in the messages received from the terminals 120a-120c. The processor determines (block 506) the relative locations of the wireless electronic communications terminals 120a-120c and/or the location of one or more sound sources based on the timing offsets, and communicates (block 508) the locations to the terminals 120a-120c and/or to another network node, e.g., PSS 110 and/or the server 114, through the network interface 320.

Figure 16:
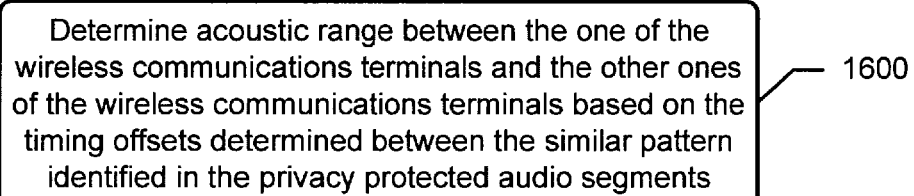
FIG. 16 is a flowchart of operations and methods that may be performed by a network node providing a location service client according to some embodiments of the present disclosure.
Figure 17:
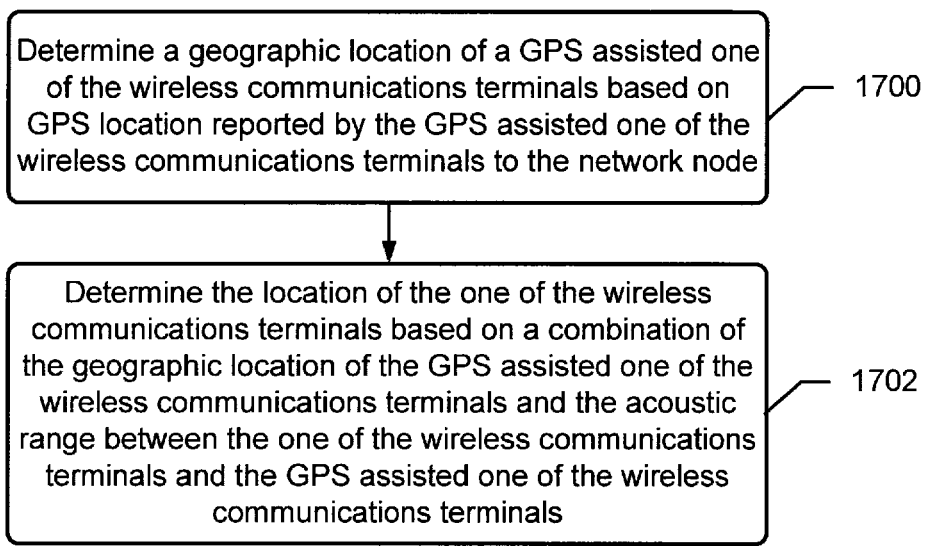
FIG. 17 is a flowchart of operations and methods that may be performed by a network node providing a location service client according to some embodiments of the present disclosure.

In some embodiments, the location service client 107 determines the relative locations using trilateration-based location determination algorithms that process timing offsets between corresponding data within the privacy protected audio segments. Referring to the embodiment of FIG. 16, the location service client 107 determines (block 1600) acoustic range between the wireless electronic communications terminals 120a-120c based on the timing offsets determined (block 504 of FIG. 5) between the similar pattern identified in the privacy protected audio segments. The acoustic range between two terminals can be determined based on using the timing offsets between sound patterns in the privacy protected audio segments reported by the two terminals and the propagation speed of sound through air to the terminals.

To determine (block 506 of FIG. 5) the location of the terminal 120a and/or the location of a sound source based on the timing offsets, the location service client 107 can determine (block 1700) a geographic location of a GNSS assisted one of the terminals 120b based on GNSS location reported by the GNSS assisted one of the terminals 120b to the network node 106. The location service client 107 can then determine (block 1702) the location of the one of the wireless electronic communications terminals and/or of a source based on a combination of the geographic location of the GNSS assisted one of the wireless electronic communications terminals and the acoustic range between the one of the wireless electronic communications terminals and the GNSS assisted one of the wireless electronic communications terminals. Alternatively or additionally, the geographic location of the terminal 120b and/or a sound source may be determined based on trilateration operations that use time difference of flight measurements for communication signals received by the terminal 120b from and/or transmitted by the terminal 120b to a plurality of the cellular radio base stations 102 having known geographic locations.

The location services client 312 may furthermore determine the location of reflective surfaces in a room containing the terminals 120a-120c based on identifying echo patterns contained in the privacy protected audio segments received from the terminals 120a-120c. A sound echo may be identified in a privacy protected audio segment by identifying similar repeating waveforms in data of the privacy protected audio segment. The location of a sound reflective surface, e.g., wall, ceiling, and/or floor, relative to each of the terminals 120a-120c may be determined by triangulating the distance to the sound reflective surface based on timing offsets determined between sound echoes that have been recorded by the terminals 120a-120c and identified in the privacy protected audio segment received from the terminals 120a-120c.

The location services client 312 may be configured to perform self-localization based on ambient sound, such as from the speaker 118. Operation and methods performed by the location services client 312 to determine the locations may be based on techniques disclosed in "An Automatic System For Microphone Self-Localization Using Ambient Sound," S Zhayida, F Andersson, Y Kuang, K Astrom—Proceedings of the European Signal Processing Conference (EUSIPCO), 2014, which is incorporated herein in its entirety.

Figure 6:
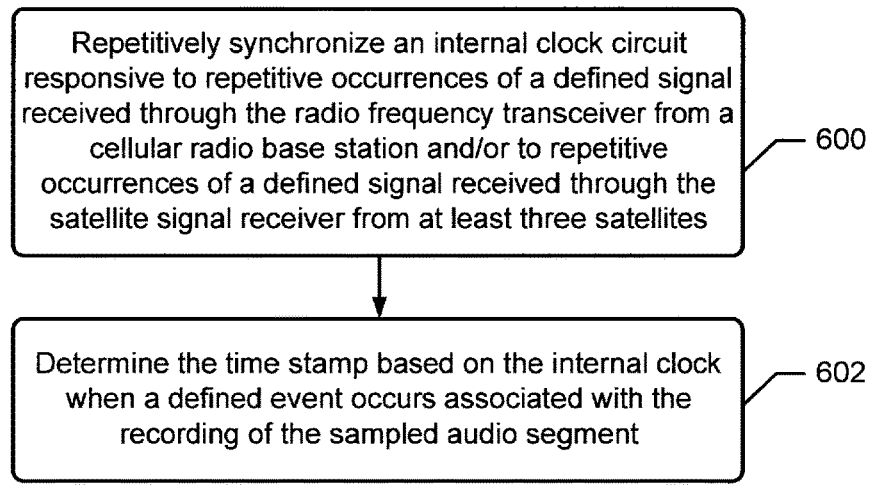
FIG. 6 is a flowchart of operations and methods that may be performed by an electronic communications terminal according to some embodiments of the present disclosure.

Referring to FIGS. 4 and 6, to determine (block 402) an accurate time stamp associated with timing of the recording of the sampled audio segment, the terminal 120a processor 140 can repetitively synchronize (block 600) an internal clock circuit 142 responsive to repetitive occurrences of a defined signal received through the radio frequency transceiver 150 from a cellular radio base station (e.g., RAN 102). The terminal 120a processor 140 can determine (block 602) the time stamp based on a clock signal from the internal clock circuit 142 when a defined event occurs associated with the recording of the sampled audio segment. The defined RF signal can have known timing characteristics which are used to provide the timing synchronization.

Alternatively or additionally, the terminal 120a processor 140 can repetitively synchronize (block 600) the internal clock circuit 142 responsive to repetitive occurrences of a defined signal received through a satellite signal receiver 156 from at least three satellites, and determine (block 602) the time stamp based on a clock signal from the internal clock circuit 142 when a defined event occurs associated with the recording of the sampled audio segment.

Figure 7:
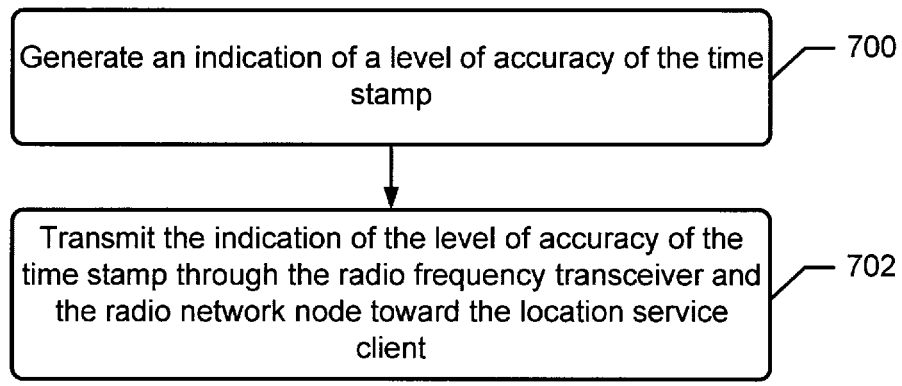
FIG. 7 is a flowchart of operations and methods that may be performed by an electronic communications terminal according to some embodiments of the present disclosure.

One or more of the terminals 120a-120c can generate an indication of a level of accuracy of the time stamp that can be used by the location service client 107 of the network node 106 to more computationally efficiently identify similar patterns between the privacy protected audio segments received from the terminals 120a-120c. Referring to FIG. 7, the terminal 120a processor 300 generates (block 700) an indication of a level of accuracy of the time stamp (e.g., determined in block 402 of FIG. 4), and transmits the indication of the level of accuracy of the time stamp through the radio frequency transceiver and the RAN 102 toward the location service client 107.

Figure 8:
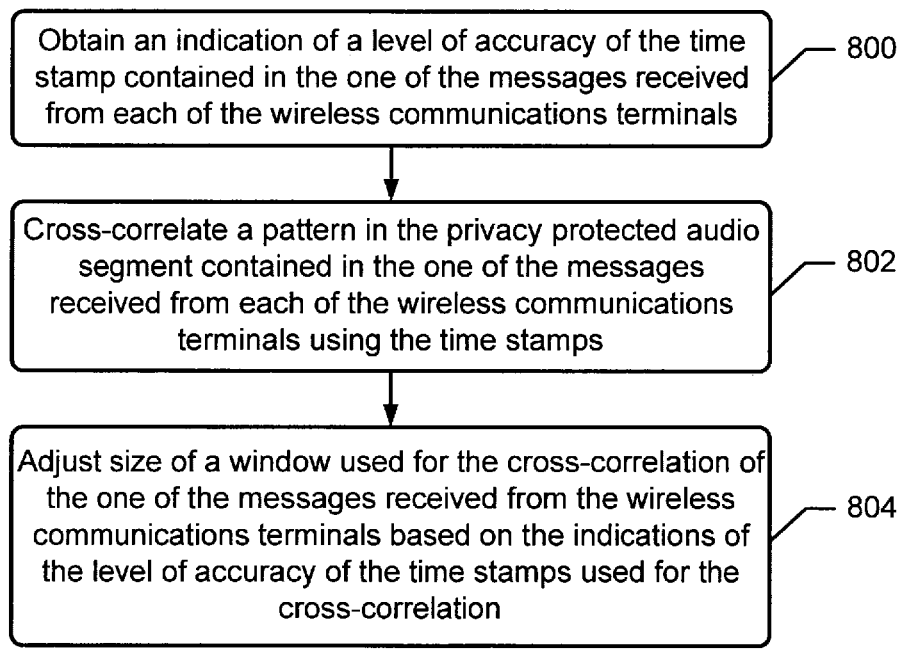
FIG. 8 is a flowchart of operations and methods that may be performed by a network node providing a location service client according to some embodiments of the present disclosure.

Referring to FIG. 8, the network node 106 processor 300 obtains (block 800), e.g., receives from the terminal 120a, the indication of the level of accuracy of the time stamp contained in the message received from the terminal 120a. When identifying (block 502 of FIG. 5) the similar pattern in the privacy protected audio segments using the time stamps contained in the messages received from each of the terminals 120a-120c, the network node 106 processor 300 cross-correlates (block 802) a pattern in the privacy protected audio segment contained in the message received from each of the terminals 120a-120c using the time stamps, and adjusts (block 804) size of a window used for the cross-correlation of the message received from the terminal 120a based on the indications of the level of accuracy of the time stamp from the terminal 120a used for the cross-correlation.

In one embodiment, the size of the cross-correlation window is reduced responsive to the indicated level of accuracy being above a defined threshold value. In contrast, the size of the cross-correlation window is increased responsive to the indicated level of accuracy being below the same or another defined threshold value. Dynamically varying the size of the cross-correlation window in this manner can substantially reduce the amount of audio data from the received privacy protected audio segments that is compared through algorithmic correlations to identify the timing offsets therebetween, when the clock circuit is known by the respective terminal(s) to have been compensated for drift within a threshold time since completing a previous compensation. Such dynamic sizing can correspondingly substantially reduce the computational resources of the processor 300 consumed by the location determinations.

The terminal 120a processor 140 may generate (block 700) the indication of the level of accuracy of the time stamp based on determining an elapsed time since a last successful synchronization of the internal clock circuit 142 of the terminal 120a was completed based on timing of a defined signal received through the radio frequency transceiver 150. Alternatively or additionally, the terminal 120a processor 140 may generate (block 700) the indication of a level of accuracy of the time stamp based on whether the terminal 120a can synchronize the internal clock circuit 142 based on a radio frequency signal received from a GNSS satellite, based on a radio frequency signal received from a cellular radio base station (e.g., the RAN 102), based on a radio frequency signal received from a wireless local area network (WLAN) access point, based on a radio frequency signal received from a digital terrestrial radio transmitter, and/or based on a radio frequency signal received from a digital radio transmitter.

As explained above, the location service client 107 can determine the relative locations between the terminals 120a-120c and/or the location of one or more sound sources using trilateration-based location determination algorithms that process timing offsets between corresponding data within the privacy protected audio segments. Accuracy of the location determination can be negatively affected by movement of a terminal while the sound is being recorded. In some embodiments, the terminals 120a-120c avoid recording sound when they sense that they are being moved and/or they estimate their distance moved while recording sound and provide that distance to the location service client 107 to improve accuracy of the location determination.

Figure 14:
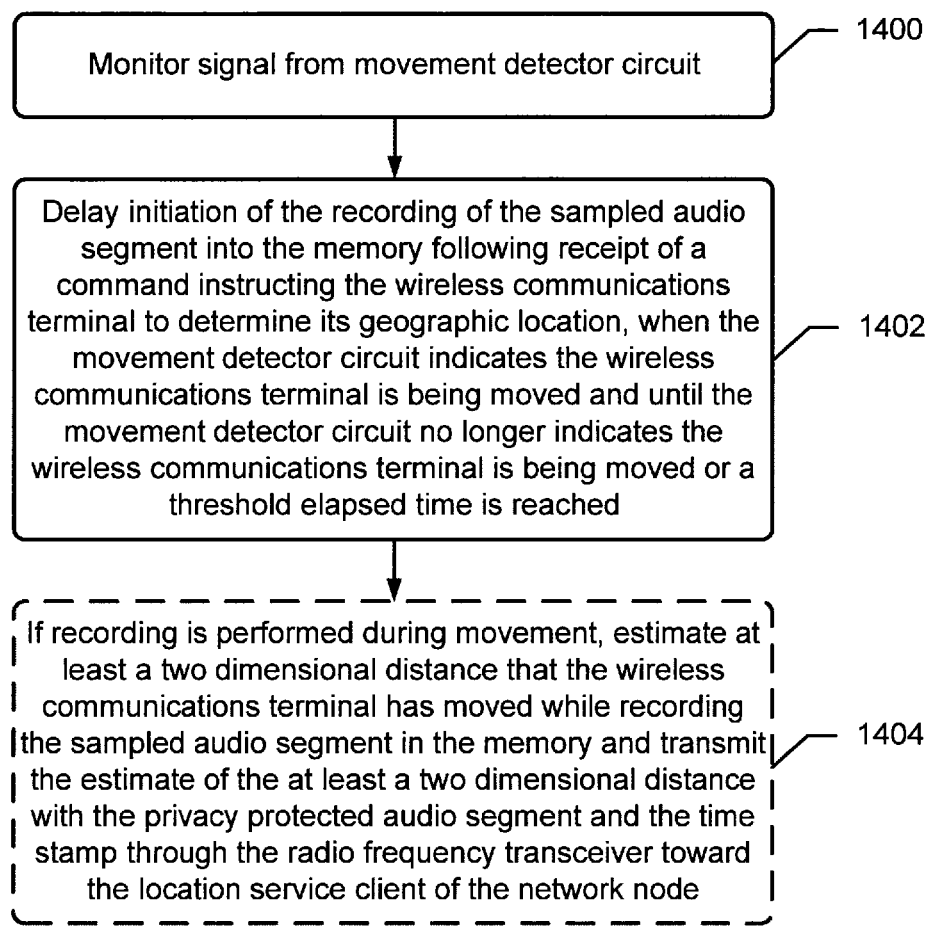
FIG. 14 is a flowchart of operations and methods that may be performed by an electronic communications terminal according to some embodiments of the present disclosure.

Referring to FIG. 2 and the flowchart of FIG. 14, the terminal 120 can include a movement detector circuit 158, such as a multi-axis accelerometer, that is configured to sense movement of the terminal 120, and which may furthermore provide signaling that the terminal processor 140 uses to estimate at least a two-dimensional distance that the terminal 120 has moved while sound is being recorded in the memory 141. The terminal 120 monitors (block 1400) a signal from the movement detector circuit 158. The terminal 120 initiates the recording of the sampled audio segment in the memory 141 responsive to receiving a command instructing the terminal 120 to determine its geographic location, and delays (block 1402) initiation of the recording of the sampled audio segment into the memory 141 following receipt of the command when the movement detector circuit 158 indicates the terminal 120 is being moved and until the movement detector circuit 158 no longer indicates the terminal 120 is being moved.

In one embodiment, if recording is being delayed because of sensed movement, upon expiration of a defined elapsed time while the movement detector circuit indicates the terminal 120 is being moved, the processor 140 estimates (block 1404) at least a two dimensional distance that the terminal 120 has moved while recording the sampled audio segment in the memory 141 and transmits the estimate of the at least a two dimensional distance with the privacy protected audio segment and the time stamp through the radio frequency transceiver 150 and the radio network node 102 toward the location service client 107. The multi-dimensional distance may be determined by, for example, integrating multi-dimension acceleration signals from the detector 158 over elapsed time while sound is being recorded. In another embodiment, a single dimension of distance that the terminal 120 has moved while recording sound is estimated and communicated to the location service client 107.

Figure 15:
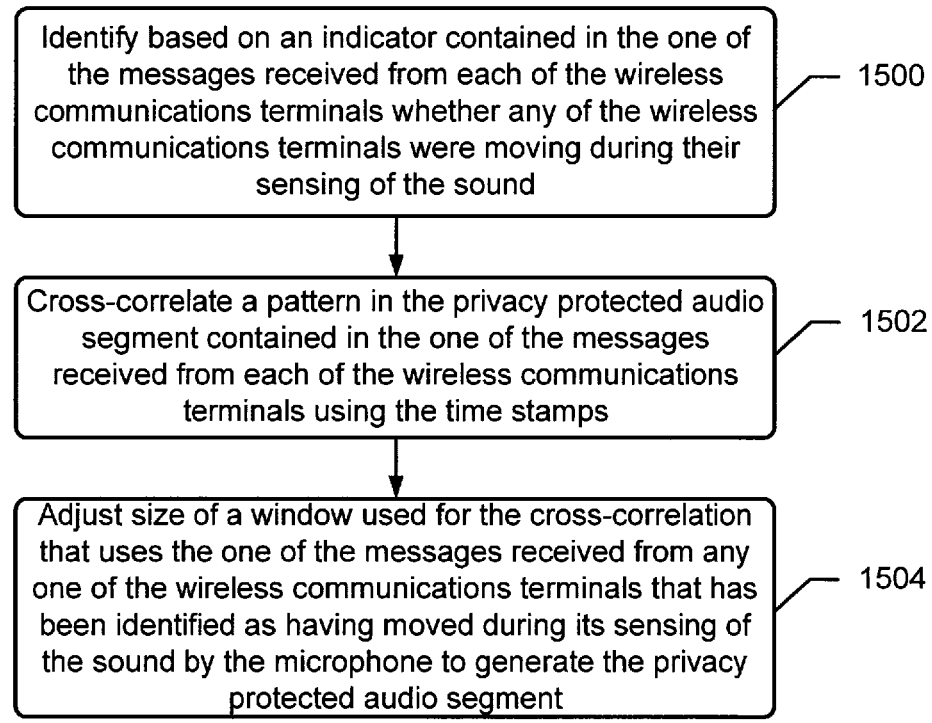
FIG. 15 is a flowchart of operations and methods that may be performed by a network node providing a location service client according to some embodiments of the present disclosure.

In another embodiment illustrated in FIG. 15, the location services client 107 (i.e., code 312 executed by processor 300) is further configured to identify (block 1500) based on an indicator contained in the one of the messages received from each of the terminals 120a-120c whether any of the terminals 120a-120c were moving during their sensing of the sound by the microphone 128 to generate the privacy protected audio segment. When identifying a similar pattern in the privacy protected audio segments contained in one of the messages received from each of the terminals 120a-120c, the location services client 107 can cross-correlate (block 1502) a pattern in the privacy protected audio segment contained in the one of the messages received from each of the terminals 120a-120c using the time stamps. The location services client 107 then adjusts (block 1504) size of a window used for the cross-correlation that uses the one of the messages received from any one of the terminals 120a-120c that has been identified as having moved during its sensing of the sound by the microphone 128 to generate the privacy protected audio segment.

In one embodiment, the size of the cross-correlation window is decreased when the terminals 120a-120c associated with the privacy protected audio segment being correlated are determined to have not been moving while the sound was being recorded. In contrast, the size of the cross-correlation window used for correlations that include a particular terminal is increased when that particular terminal was determined to have been moving while recording sound. Adjusting the size of the correlation window in this manner may substantially reduce the amount of processor 300 resources used for determining location when the terminals 120a-120c are not moving while recording sound, and may increase the accuracy of the correlations when one or more of the terminals 120a-120c was moving while recording sound by then using a larger correlation window.

In a further embodiment described in the context of FIG. 15, the location services client 107 uses an estimate of how far a terminal moved while the terminal recorded sound, to adjust the cross-correlation window based on a estimation of the effect of the movement on timing correlations. The location services client 107 obtains, e.g., receives, in a message from one of the terminals 120a, an estimate of a distance that the terminal 120a moved during its recording of the sound. As explained above regarding block 1404 of FIG. 14, the terminal 120a can estimate how far it has moved while recording sound using the signal from the movement detector circuit 158 and elapsed time while recording. The location services client 107 responsively adjusts (block 1504) size of the window used for the cross-correlation of a privacy protected audio segment received from the terminal 120a, by an amount determined based on the estimate of the distance.

For example, the location services client 107 can increase the size of the window used for the cross-correlation when the estimate of the distance is more than a threshold amount because of the greater range of corresponding timing offsets that may be identified between the patterns in the privacy protected audio segments received from the terminals being compared for correlation. In contrast, the location services client 107 can decrease or maintain the size of the window used for the cross-correlation when the estimate of the distance is less than the same or another threshold amount because of the smaller range of corresponding timing offsets that may be identified between the patterns in the privacy protected audio segments received from the terminals being compared for correlation.

When determining (block 402) the time stamp, a latency necessarily exists between when sound is sensed by the microphone 128 of the terminal 120a and when a corresponding portion of the sampled audio segment is recorded in the memory 141 of the terminal 120a, such as due to processing delays associated with analog to digital conversion, digital sampling rate, buffering of samples, digital signal processing of the sample, etc. Although the latency may be brief, it can vary between different models and/or types of terminals 120a-120c. Differences in the latencies introduces error when the network node 106 identifies (block 504 of FIG. 5) the timing offsets between the similar pattern identified in the privacy protected audio segments using the time stamps contained in the messages received from the terminals 120a-120c, and results in reduced accuracy of the determined (block 506 of FIG. 5) location of one of the terminals 120a-120c based on the timing offsets.

Figure 9:
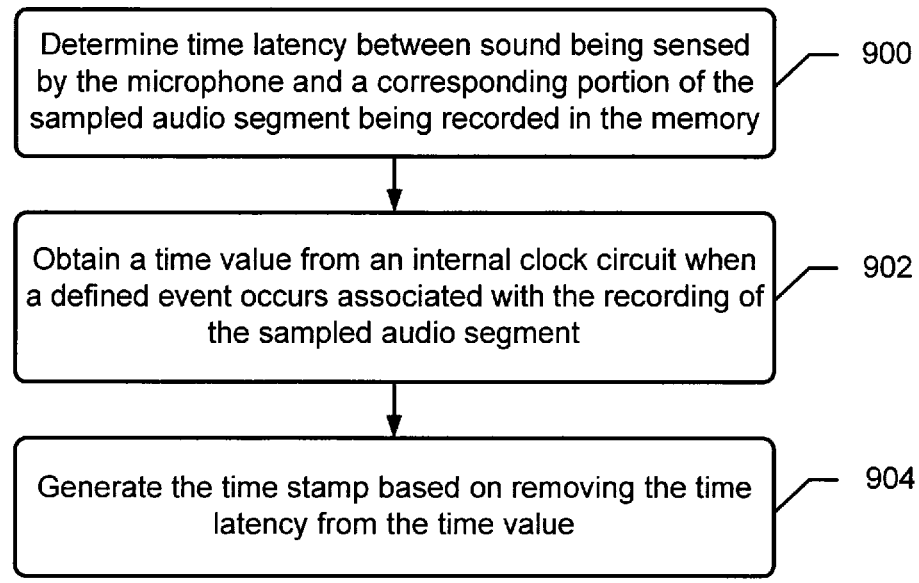
FIG. 9 is a flowchart of operations and methods that may be performed by an electronic communications terminal according to some embodiments of the present disclosure.

Referring to FIG. 9, the terminal 120a processor 140 can improve the accuracy of the location determined (block 506 of FIG. 5) by the network node 106 by, when determining (block 402 of FIG. 4) the time stamp, determining (block 900) the time latency between sound being sensed by the microphone 128 and a corresponding portion of the sampled audio segment being recorded in the memory 141, obtaining (block 902) a time value from the internal clock circuit 142 when a defined event occurs associated with the recording of the sampled audio segment, and generating (block 904) the time stamp based on removing the time latency from the time value. The time latency may be measured by the terminal 120a processor 140 measuring elapsed time between emitting a sound through a loudspeaker 126 and recording the corresponding sound sensed by the microphone 128 into the memory 141. Alternatively, the time latency may be defined in the memory 141 by an operator, such as during manufacturing or initialization of the terminal 120a.

Various operations and methods that can be performed by one or more of the terminals 120a-120c to generate a privacy protected audio segment by rendering unintelligible any human voice component contained therein, are now described in the context of example flowcharts of FIGS. 10-13.

Figure 10:
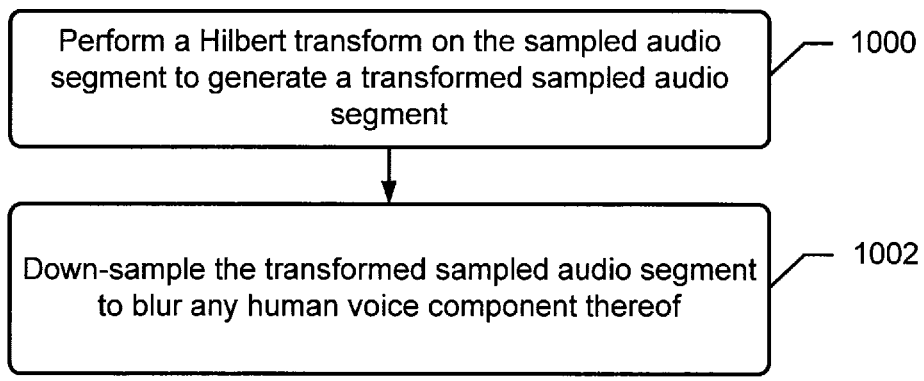
FIG. 10 is a flowchart of operations and methods that may be performed by an electronic communications terminal according to some embodiments of the present disclosure.

In the embodiment of FIG. 10, the processor 140 of terminal 120 (FIG. 2) processes the sampled audio segment to render unintelligible any human voice component thereof to generate a privacy protected audio segment, by performing (block 1000) an envelope detection on the sampled audio segment to generate a transformed sampled audio segment. The envelope detection may be performed using a Hilbert transform, absolute values, and/or square values of samples or other envelope detection operational algorithm in accordance with other embodiments. The envelope detection may be constrained to being performed within one or more defined frequency bands which may be defined to be outside the range of human voice, e.g., outside a frequency range of 2 kHz and 5 kHz or, more preferably, outside a frequency range of 20 Hz and 20 kHz. In another embodiment, the envelope detection is constrained to being performed within one or more defined frequency bands which are defined to be within the range of human voice, e.g., within a frequency range of 2 kHz and 5 kHz or, more preferably, within a frequency range of 20 Hz and 20 kHz, to allow identification and removal voice associated content from the sampled audio segment. The terminal 120 may down-sample before or after performing any envelope detection to blur any human voice component thereof.

Figure 11:
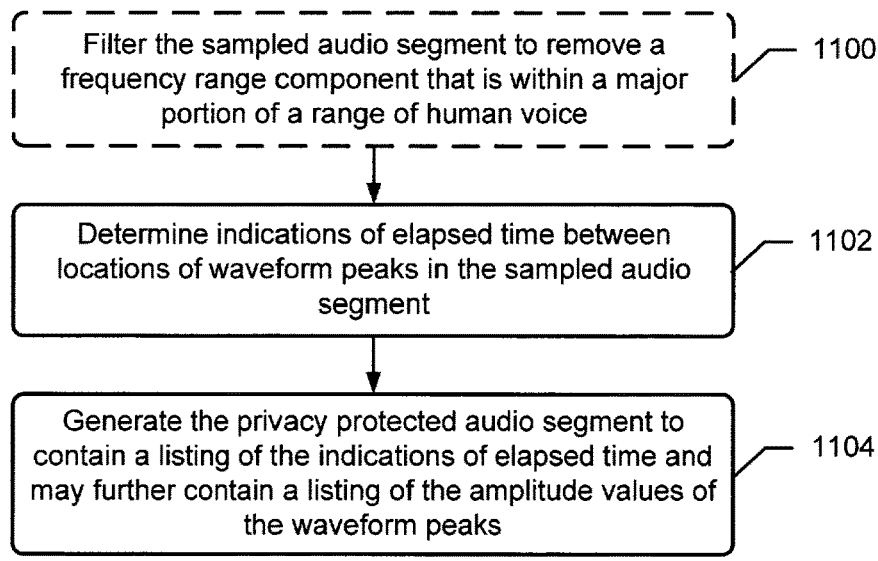
FIG. 11 is a flowchart of operations and methods that may be performed by an electronic communications terminal according to some embodiments of the present disclosure.
Figure 12:
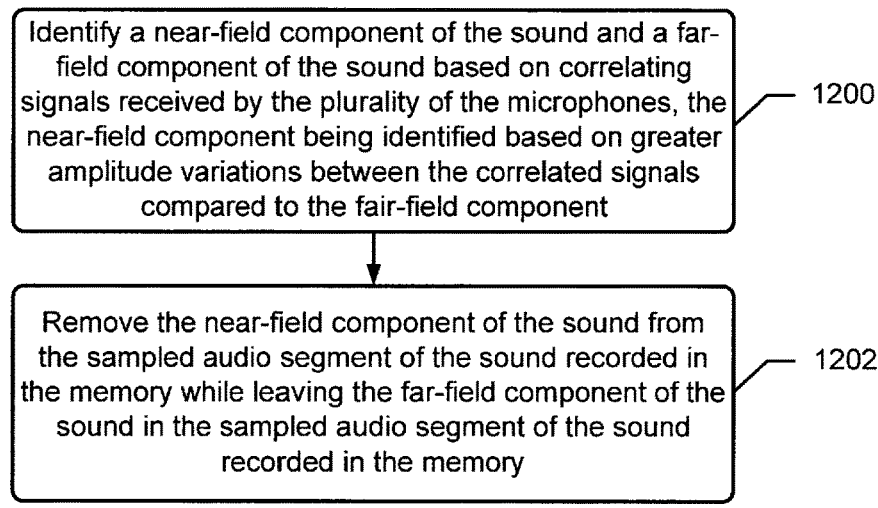
FIG. 12 is a flowchart of operations and methods that may be performed by an electronic communications terminal according to some embodiments of the present disclosure.

In the embodiment of FIG. 11, the processor 140 of terminal 120 (FIG. 2) may process the sampled audio segment to render unintelligible any human voice component thereof by optionally filtering (block 1100) the sampled audio segment to remove a frequency range component that is within a major portion of a range of human voice, to generate the privacy protected audio segment. In one embodiment the sampled audio segment is filtered (block 1100) to remove at least some frequency components below ultrasonic. In another embodiment the sampled audio segment is filtered (block 1100) to at least remove frequencies within a frequency range of 2 kHz and 5 kHz or, more preferably, within a frequency range of 20 Hz and 20 kHz.

In the embodiment of FIG. 11, the processor 140 of terminal 120 (FIG. 2) processes the sampled audio segment to render unintelligible any human voice component thereof by determining (block 1102) indications of elapsed time between locations of waveform peaks in the sampled audio segment, and generating (block 1104) the privacy protected audio segment to contain a listing of the indications of elapsed time. For example, locations of waveform peaks in the sampled audio segment are identified, and the timing between each of the sequence of waveform peaks is determined. The timing may indicate the number of intervening samples between two peaks in the sequence or may indicate elapsed time between the two peaks based on knowing a sampling rate of the sampled audio segment and the number of intervening samples between the peaks. Thus, for example, the privacy protected audio segment can contain a list of the number of data bytes, or other unit, between data bytes that corresponds to adjacent peaks in an audio waveform represented by the sampled audio segment.

In a further embodiment, the processor 140 of terminal 120 measures amplitude values of the waveform peaks in the sampled audio segment, and generates (block 1104) the privacy protected audio segment to further contain the listing of the amplitude values of the waveform peaks.

In another embodiment, the processor 140 of terminal 120 processes the sampled audio segment to render unintelligible any human voice component thereof by identifying a near-field component of sound in the sampled audio segment and removing the near-field component from the sampled audio segment to generate the privacy protected audio segment. In one embodiment, the terminal 120 includes a plurality of the microphones 128. The processor 140 is further configured to identify a near-field component of the sound and a far-field component of the sound based on correlating signals received by the microphones 128. The near-field component is identified based on it having greater amplitude variations between the correlated signals compared to the fair-field component. The processor 140 processes the sampled audio segment to render unintelligible any human voice component thereof by removing the near-field component of the sound from the sampled audio segment of the sound recorded in the memory 141 while leaving the far-field component of the sound in the sampled audio segment of the sound recorded in the memory 141.

Figure 13:
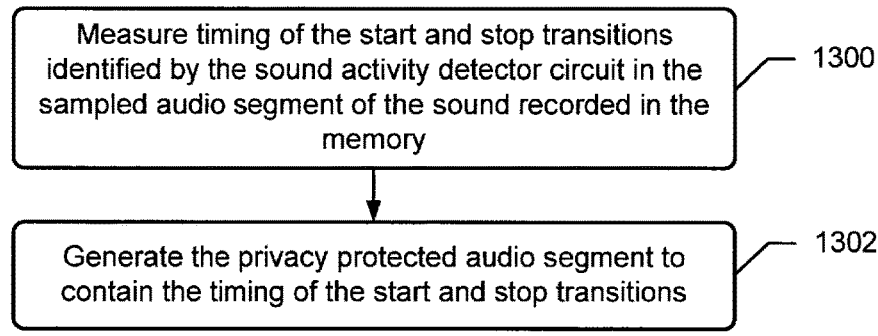
FIG. 13 is a flowchart of operations and methods that may be performed by an electronic communications terminal according to some embodiments of the present disclosure.

In the embodiment of FIG. 13, the terminal 120 includes a sound activity detector circuit 148 that is configured to identify start and stop sound transitions in the sampled audio segment of the sound recorded in the memory 141. The sound activity detector circuit 148 may comprise code executed by the processor 140 and/or may be a circuit (e.g., programmable logic component) that is operationally separate from the memory 148 and processor 140. The processor 140 processes the sampled audio segment to render unintelligible any human voice component thereof by measuring (block 1300) timing of the start and stop transitions identified by the sound activity detector circuit 148 in the sampled audio segment of the sound recorded in the memory 141, and generates (block 1302) the privacy protected audio segment to contain the timing of the start and stop transitions. For example, the privacy protected audio segment can be generated to contain the timing of the start and stop transitions of various sounds sensed by the microphone 128. Thus, for example, the privacy protected audio segment can be generated to indicate the duration of spoken words and/or gaps between spoken words that are overheard in a discussion between persons who are within audible range of the microphone 128 and, thereby, recorded through the sampled audio segment.

FURTHER DEFINITIONS AND EMBODIMENTS

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when a node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub-combination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. An electronic communications terminal comprising:
   a network interface;
   a microphone configured to sense sound;
   a processor coupled to the microphone and the network interface; and
   a memory coupled to the processor and storing computer readable program code that is executable by the processor to:
      record in the memory a sampled audio segment of the sound sensed by the microphone;
      determine a time stamp associated with timing of the recording of the sampled audio segment;
      store the time stamp in the memory associated with the sampled audio segment; and
      transmit the sampled audio segment and the time stamp, through the network interface, toward a location service client of a network node that determines location of a sound source and/or a location of the electronic communications terminal based on correlating the sampled audio segment and other sampled audio segments of the sound received from other electronic communications terminals,
   wherein the determination of the time stamp associated with timing of the recording of the sampled audio segment, comprises:
      determining time latency between sound being sensed by the microphone and a corresponding portion of the sampled audio segment being recorded in the memory;
      obtaining a time value from an internal clock circuit when a defined event occurs associated with the recording of the sampled audio segment; and
      generating the time stamp based on removing the time latency from the time value.

2. The electronic communications terminal of claim 1, wherein the processor is further configured by the computer readable program code to:
   receive a location identification message from the location service client of the network node, via the network interface, the location identification message containing data identifying a geographic location of the electronic communications terminal; and
provide the data identifying the geographic location to a location service user application being executed by the processor.

3. The electronic communications terminal of claim 1, further comprising a cellular transceiver, wherein the determination of a time stamp associated with timing of the recording of the sampled audio segment, comprises:
repetitively synchronizing an internal clock circuit responsive to repetitive occurrences of a defined signal received through the cellular transceiver from a cellular radio base station; and
determining the time stamp based on a clock signal from the internal clock circuit when a defined event occurs associated with the recording of the sampled audio segment.

4. The electronic communications terminal of claim 1, further comprising a satellite signal receiver, wherein the determination of a time stamp associated with timing of the recording of the sampled audio segment, comprises:
repetitively synchronizing an internal clock circuit responsive to repetitive occurrences of a defined signal received through the satellite signal receiver from at least three satellites; and
determining the time stamp based on a clock signal from the internal clock circuit when a defined event occurs associated with the recording of the sampled audio segment.

5. The electronic communications terminal of claim 1, wherein:
the determination of a time stamp associated with timing of the recording of the sampled audio segment, comprises generating an indication of a level of accuracy of the time stamp; and
the transmission of the sampled audio segment and the time stamp toward a location service client, further comprises transmitting the indication of the level of accuracy of the time stamp through the network interface toward the location service client.

6. The electronic communications terminal of claim 5, further comprising a radio frequency transceiver, wherein:
generating an indication of a level of accuracy of the time stamp, comprises determining an elapsed time since a last successful synchronization of an internal clock circuit was completed based on timing of a defined signal received through the radio frequency transceiver.

7. An electronic communications terminal comprising:
a network interface;
a microphone configured to sense sound;
a processor coupled to the microphone and the network interface; and
a memory coupled to the processor and storing computer readable program code that is executable by the processor to perform operations comprising:
recording in the memory a sampled audio segment of the sound sensed by the microphone;
determining a time stamp associated with timing of the recording of the sampled audio segment;
storing the time stamp in the memory associated with the sampled audio segment;
transmitting the sampled audio segment and the time stamp, through the network interface, toward a location service client of a network node that determines location of a sound source and/or a location of the electronic communications terminal based on correlating the sampled audio segment and other sampled audio segments of the sound received from other electronic communications terminals;
processing the sampled audio segment to render unintelligible any human voice component thereof to generate a privacy protected audio segment; and
transmitting the privacy protected audio segment and the time stamp through the network interface toward the location service client of the network node that determines location of the sound source and/or location of the electronic communications terminal based on correlating the privacy protected audio segment and other privacy protected audio segments of the sound received from other electronic communications terminals.

8. The electronic communications terminal of claim 7, wherein the processing of the sampled audio segment to render unintelligible any human voice component thereof to generate a privacy protected audio segment, comprises:
determining indications of elapsed time between locations of waveform peaks in the sampled audio segment; and
generating the privacy protected audio segment to contain a listing of the indications of elapsed time.

9. The electronic communications terminal of claim 7, wherein the processing of the sampled audio segment to render unintelligible any human voice component thereof to generate a privacy protected audio segment, further comprises:
measuring amplitude values of the waveform peaks in the sampled audio segment; and
generating the privacy protected audio segment to further contain the listing of the amplitude values of the waveform peaks.

10. The electronic communications terminal of claim 7, wherein the processing of the sampled audio segment to render unintelligible any human voice component thereof to generate a privacy protected audio segment, comprises:
performing envelope detection on the sampled audio segment to generate the privacy protected audio segment.

11. The electronic communications terminal of claim 10, wherein the performing envelope detection on the sampled audio segment to generate the privacy protected audio segment, comprises:
constraining the envelope detection to being performed within one or more defined frequency bands outside a range of human voice.

12. The electronic communications terminal of claim 10, wherein the performing envelope detection on the sampled audio segment to generate the privacy protected audio segment, comprises:
performing a Hilbert transform on the sampled audio segment to generate the transformed sampled audio segment; and
down-sampling the transformed sampled audio segment to blur any human voice component thereof.

13. The electronic communications terminal of claim 7, wherein the processing of the sampled audio segment to render unintelligible any human voice component thereof to generate a privacy protected audio segment, comprises:
filtering the sampled audio segment to remove a frequency range component that is within a major portion of a range of human voice.

14. The electronic communications terminal of claim 7, further comprising:
a plurality of the microphones,
wherein the processor is further configured by the computer readable program code to identify a near-field component of the sound and a far-field component of the sound based on correlating signals received by the plurality of the microphones, the near-field component being identified based on greater amplitude variations between the correlated signals compared to the far-field component, and wherein the processing of the sampled audio segment to render unintelligible any human voice component thereof to generate a privacy protected audio segment, comprises:

removing the near-field component of the sound from the sampled audio segment of the sound recorded in the memory while leaving the far-field component of the sound in the sampled audio segment of the sound recorded in the memory.

15. The electronic communications terminal of claim 7, further comprising:

a sound activity detector circuit configured to identify start and stop sound transitions in the sampled audio segment of the sound recorded in the memory, wherein the processing of the sampled audio segment to render unintelligible any human voice component thereof to generate a privacy protected audio segment, comprises:

measuring timing of the start and stop transitions identified by the sound activity detector circuit in the sampled audio segment of the sound recorded in the memory; and generating the privacy protected audio segment to contain the timing of the start and stop transitions.

16. A network node providing a location service to electronic communications terminals, the network node comprising:

a network interface configured to communicate with a plurality of electronic communications terminals;

a processor coupled to the network interface; and a memory coupled to the processor and storing computer readable program code that is executable by the processor to:

receive messages from the electronic communications terminals through the network interface, each of the messages containing a sampled audio segment and a time stamp, wherein the time stamp indicates timing associated with when the sampled audio segment was recorded by the electronic communications terminal;

identify a similar pattern in the sampled audio segments contained in one of the messages received from each of the electronic communications terminals;

identify timing offsets between the similar pattern identified in the sampled audio segments using the time stamps contained in the one of the messages received from each of the electronic communications terminals;

determine location of a sound source of the sound and/or a location of the electronic communications terminals based on the timing offsets; and communicate the location to the at least one of the electronic communications terminals and/or another network node through the network interface;

wherein the processor is further configured by the computer readable program code to obtain an indication of a level of accuracy of the time stamp contained in the one of the messages received from each of the electronic communications terminals; and wherein the identification of the similar pattern in the privacy protected audio segments contained in one of the messages received from each of the electronic communications terminals, comprises:

cross-correlating a pattern in the privacy protected audio segment contained in the one of the messages received from each of the electronic communications terminals using the time stamps; and adjusting size of a window used for the cross-correlation of the one of the messages received from the electronic communications terminals based on the indications of the level of accuracy of the time stamps used for the cross-correlation.

17. The network node of claim 16, wherein the determination of the location of the sound source of the sound and/or the location of the electronic communications terminals based on the timing offsets, comprises:

determining acoustic range between the one of the electronic communications terminals and the other ones of the electronic communications terminals based on the timing offsets determined between the similar pattern identified in the sampled audio segments.

18. The network node of claim 17, wherein the determination of the location of the sound source of the sound and/or the location of the electronic communications terminals based on the timing offsets, further comprises:

determining a geographic location of a GNSS assisted one of the electronic communications terminals based on GNSS location reported by the GNSS assisted one of the electronic communications terminals to the network node; and determining the location of the one of the electronic communications terminals based on a combination of the geographic location of the GNSS assisted one of the electronic communications terminals and the acoustic range between the one of the electronic communications terminals and the GNSS assisted one of the electronic communications terminals.

* * * * *